United States Patent
Lu et al.

(10) Patent No.: US 9,381,596 B2
(45) Date of Patent: Jul. 5, 2016

(54) WELDING FIXTURE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Jian-Qiang Lu, Jiashan (CN); Jian-Hua Xu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 65 days.

(21) Appl. No.: 14/325,592

(22) Filed: Jul. 8, 2014

(65) Prior Publication Data
US 2015/0014395 A1    Jan. 15, 2015

(30) Foreign Application Priority Data
Jul. 10, 2013   (CN) .................... 2013 2 04089725 U

(51) Int. Cl.
B23K 37/04     (2006.01)
B23K 9/20      (2006.01)

(52) U.S. Cl.
CPC .. B23K 37/04 (2013.01); B23K 9/20 (2013.01)

(58) Field of Classification Search
None
See application file for complete search history.

(56) References Cited

U.S. PATENT DOCUMENTS

| | | | | |
|---|---|---|---|---|
| 2,385,109 | A * | 9/1945 | Seltzer | B23K 11/063 219/64 |
| 3,430,028 | A * | 2/1969 | Flanders | B23K 9/02 219/108 |
| 3,731,052 | A * | 5/1973 | Ogawa | H01J 37/18 219/121.13 |
| 4,162,391 | A * | 7/1979 | Sciaky | H01J 37/18 219/121.13 |
| 2010/0213242 | A1* | 8/2010 | Fujimoto | B23K 20/1245 228/2.1 |
| 2012/0161378 | A1* | 6/2012 | Wen | B23K 31/02 269/56 |

* cited by examiner

*Primary Examiner* — Devang R Patel
(74) *Attorney, Agent, or Firm* — ScienBiziP, P.C.

(57) ABSTRACT

A welding fixture comprises a suction assembly, a drive assembly, and a positioning assembly. The suction assembly comprises a fixing member and a suction member slidably coupled to the fixing member. The drive assembly couples the fixing member to the suction member. The suction assembly comprises a positioning member slidably coupled to the fixing member, a flange protruding from the positioning member, and an elastic member sleeved on the positioning member. The elastic member is configured to bias the flange away from a side of the fixing member. The drive assembly can move the suction member and thereby moving the workpiece towards the positioning member, so that the weldment makes contact with the workpiece via the positioning member.

14 Claims, 3 Drawing Sheets

WELDING FIXTURE

FIELD

The subject matter herein generally relates to a welding fixture.

BACKGROUND

A mechanism is used in welding to weld work pieces.

BRIEF DESCRIPTION OF THE DRAWINGS

Implementations of the present technology will now be described, by way of example only, with reference to the attached figures.

DETAILED DESCRIPTION

Figure 1:
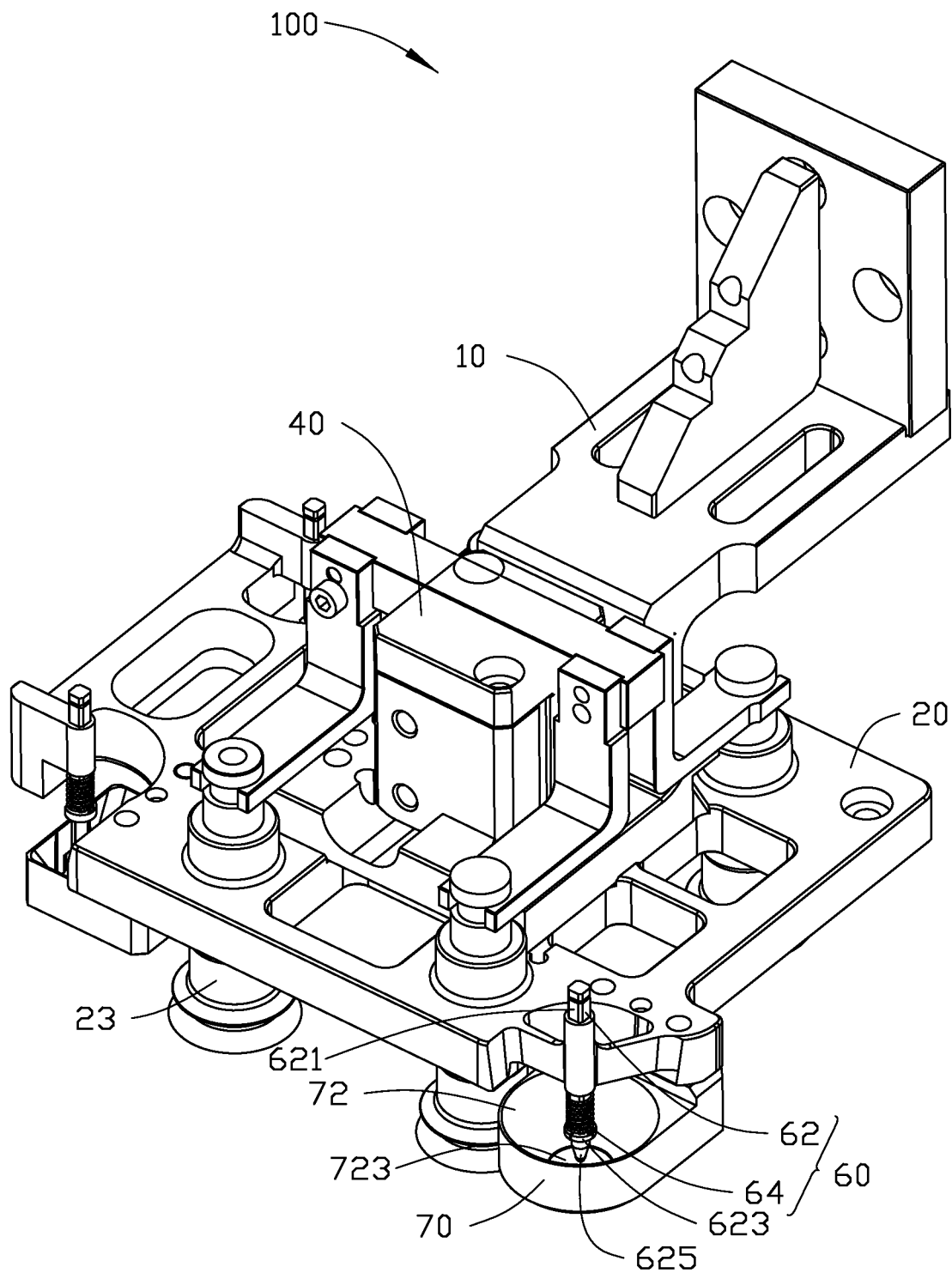
FIG. 1 is an assembled, isometric view of an embodiment of a welding fixture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
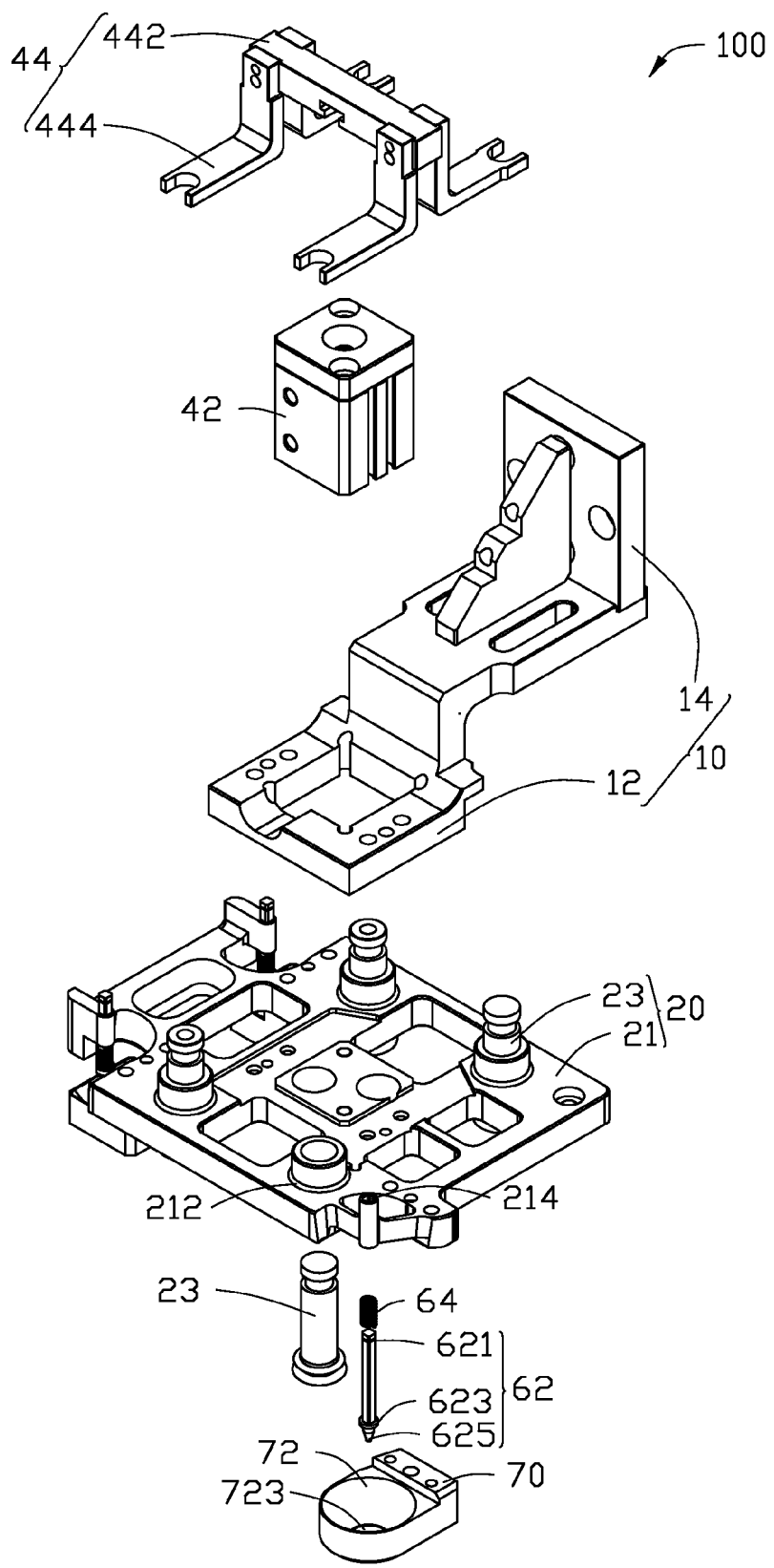
FIG. 2 is an exploded, isometric view of the welding fixture of FIG. 1.
Figure 3:
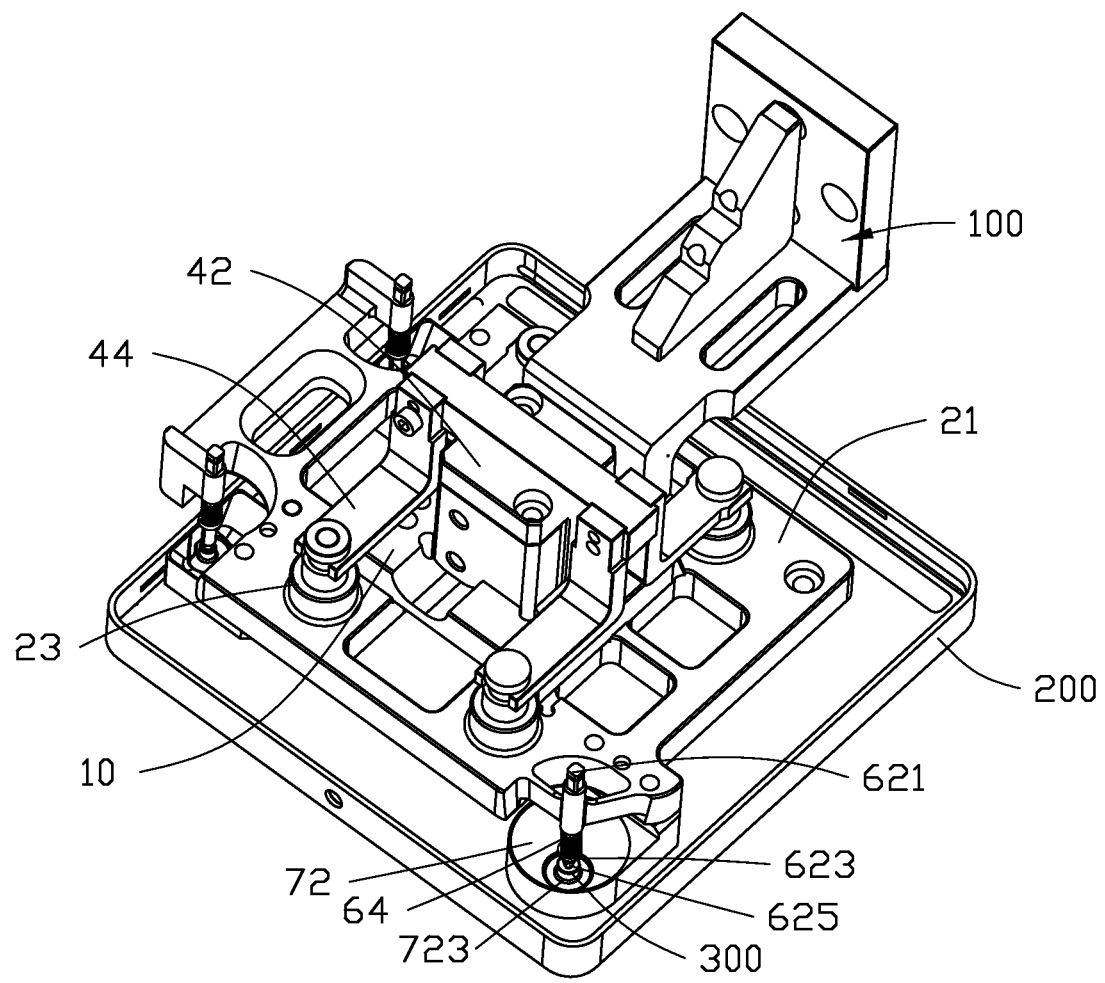
FIG. 3 is the welding fixture of FIG. 1 in an operating state.

FIGS. 1 and 2 illustrate a welding fixture 100 configured to weld a weldment 300 (see FIG. 3) to a workpiece 200 (see FIG. 3). The welding fixture 100 can include a support member 10, a suction assembly 20, a drive assembly 40, a plurality of positioning assemblies 60, and a plurality of protection members 70. The support member 10 can be configured to couple to a mechanism (not shown), and the mechanism can move the welding fixture 100. The suction assembly 20 can be fixed to the support member 10. The drive assembly 40 can be assembled to the support member 10, and can drive the suction assembly 20 to provide suction to the workpiece 200. The positioning assemblies 60 can be fixed to the suction assembly 20 and configured to position the weldment 300. Each protection member 70 can cover a corresponding positioning assembly 60. In the illustrated embodiment, the weldment 300 is a stud. In other embodiments, the weldment 300 can be a screw, or other accessories to be welded.

The support member 10 can be substantially L-shaped and include a support portion 12 and a connecting portion 14 coupled to an end of the support portion 12. The connecting portion 14 can be configured to couple to the mechanism.

The suction assembly 20 can include a fixing member 21, and a plurality of suction members 23. The fixing member 21 can be substantially rectangular. The fixing member 21 can be fixed to the support portion 12. The fixing member 21 can define a plurality of sliding holes 212 and a plurality of receiving holes 214. Both the sliding holes 212 and the receiving holes 214 can be located adjacent to a periphery of the fixing member 21 and can surround the support portion 12. The receiving holes 214 can be spaced from the sliding holes 212. The plurality of sliding holes 212 can be spaced from each other. Each suction member 23 can extend through a corresponding sliding hole 212. An end of the suction member 23 can extend out a side of the fixing member 21 adjacent to the support member 10 to couple to a vacuum generator (not shown). Another end of the suction member 23 can extend out a side of the fixing member 21 away from the support member 10. In the illustrated embodiment, a number of the sliding holes 212 and the suction members 23 can both be four. In other embodiments, the number of the sliding holes 212 and the suction members 23 can both be one, two, three, or more.

The drive assembly 40 can include a drive member 42 and a connecting member 44. The drive member 42 can be fixed to the support portion 12. The connecting member 44 can be fixed to a drive end of the drive member 42 and include a resisting portion 442 and a plurality of fixing portions 444. The resisting portion 442 can be substantially strip-shaped and fixed to the drive end of the drive member 42. The fixing portion 444 can be substantially L-shaped. The fixing portions 444 can be fixed to opposite ends of the resisting portion 442 respectively. An end of each of the fixing portions 444 away from the resisting portion 442 can be coupled to a corresponding suction member 23. The drive member 42 can drive the connecting member 44 to move along a direction away from the support portion 12, thereby driving the suction member 23 to move. In the illustrated embodiment, the connecting member 44 includes four fixing portions 444. In other embodiments, the number of the fixing portions 444 can be one, two, three, or more than four.

The positioning assemblies 60 can extend through the receiving holes 214 respectively. In the illustrated embodiment, the number of the receiving holes 214 and the positioning assemblies 60 can both be three. In other embodiment, the number of the receiving holes 214 and the positioning assemblies 60 can both be one, two, or more. Each positioning assembly 60 can include a positioning member 62 and an elastic member 64. The positioning member 62 can be substantially rod-shaped and include a sliding portion 621 and an annular flange 623 protruding from an end of the sliding portion 621. A conical positioning portion 625 can extend from an end of the flange 623 away from the sliding portion 621. The sliding portion 621 can be slidably received by the receiving hole 214, and the flange 623 and the conical positioning portion 625 can both extend out of the receiving hole 214. The elastic member 64 can be sleeved on the sliding portion 621 and resist between the flange 623 and the fixing member 21. In the illustrated embodiment, the elastic member is a spring. In other embodiments, the elastic member can be elastic sleeves.

Each of the protection members 70 can be coupled to a side of the fixing member 21 away from the support member 10 and cover the receiving hole 214 to prevent the welding slag from splashing. In the illustrated embodiment, the number of the protection members 70 is equal to the number of the positioning assemblies 60. The protection member 70 can be substantially rectangular and define an inverted conical protection groove 72. The protection groove 72 can define an inserting hole 723 through a bottom of the protection groove 72. The positioning member 62 can be partially received in the protection groove 72, and the conical positioning portion 625 can extend out of the inserting hole 723.

FIG. 3 illustrates that, in operation, the workpiece 200 can define a plurality of grooves (not shown) to receive the weldment 300. The mechanism (not shown) can move the welding fixture 100 to the workpiece 200, and the suction member 23 can be in contact with the workpiece 200. Each positioning member 62 can be inserted into the corresponding weldment 300. The vacuum generator (not shown) can drive the suction member 23 to provide suction to the workpiece 200. The drive member 42 can move the connecting member 44 along a direction away from the support portion 12. The connecting member 44 can drive the suction member 23 to move along the direction away from the support portion 12. The suction member 23 can thereby move the workpiece 200 upward. In this way, the workpiece 200 can push the positioning member 62 to move towards the support member 10, and the elastic member 64 can be deformed, the protection member 70 can resist the workpiece 200. The elastic member 64 can press the positioning portion 625. Therefore, the weldment 300 can make close contact with the workpiece 200, and the welding slag can splash to the sidewalls of the protection groove 72.

The support member 10 can be omitted, so long as the suction assembly 20 is directly connected to the mechanical device, and the drive assembly 40 is coupled to the fixing member 21 of the suction assembly 20.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A welding fixture configured to weld a weldment to a workpiece comprising:
   a suction assembly comprising a fixing member and a suction member slidably coupled to the fixing member and configured to be coupled to the workpiece;
   a drive assembly configured to couple the fixing member to the suction member; and
   a positioning assembly comprising:
      a positioning member slidably coupled to the fixing member;
      a flange protruding from the positioning member; and
      an elastic member sleeved on the positioning member and configured to bias the flange away from a side of the fixing member;
   wherein the drive assembly is configured to drive the suction member thereby driving the workpiece to move towards the positioning member and the elastic member is configured to deform and position the weldment upon deformation, so that the weldment makes contact with the workpiece via the positioning member; and
   wherein the fixing member defines a receiving hole, the positioning member comprises a sliding portion and a positioning portion coupled to the sliding portion, the sliding portion is slidably received in the receiving hole, and opposite ends of the sliding portion extend out of the receiving hole.

2. The welding fixture of claim 1, wherein the flange protrudes from an end of the sliding portion adjacent to the positioning portion, and the positioning portion is configured to position the weldment.

3. The welding fixture of claim 1, wherein the drive assembly comprises a drive member coupled to the fixing member, and a connecting member coupling the drive member and the suction member, wherein the drive member moves the connecting member and thereby moving the suction member along a direction away from the workpiece.

4. The welding fixture of claim 3, wherein the connecting member comprises a resisting portion coupled to the drive member and a fixing portion coupled to the resisting portion, and an end of the fixing portion away from the resisting portion is coupled to the suction member.

5. The welding fixture of claim 1, wherein the fixing member defines a sliding hole, the suction member is inserted into the sliding hole, and opposite ends of the suction member extend out of the fixing member.

6. The welding fixture of claim 1, wherein the welding fixture further comprises a support member, the support member comprises a support portion and a connecting portion coupled to the support portion, and the fixing member and the drive assembly are coupled to the support portion.

7. A welding fixture configured to weld a weldment to a workpiece comprising:
   a suction assembly comprising a fixing member and a suction member slidably coupled to the fixing member and configured to be coupled to the workpiece;
   a drive assembly configured to couple the fixing member to the suction member;
   a protection member coupled to the fixing member and defining a protection groove; and
   an inserting hole defined on a bottom of the protection groove;
   wherein the drive assembly is configured to drive the suction member thereby driving the workpiece to move towards the protection member, so that the workpiece resist the protection member and the weldment is received in the inserting hole; and
   wherein the welding fixture further comprises a positioning assembly, the positioning assembly comprises a positioning member slidably coupled to the fixing member, and the positioning member is partially received in the protection groove and extends out of the inserting hole.

8. The welding fixture of claim 7, wherein the positioning assembly further comprises a flange protrudes from the positioning member and an elastic member sleeved on the positioning member and configured to bias the flange away from a side of the fixing member.

9. The welding fixture of claim 8, wherein the positioning member comprises a sliding portion and a positioning portion coupled to the sliding portion, the flange protrudes from an end of the sliding portion adjacent to the positioning portion, and the positioning portion is configured to position the weldment.

10. The welding fixture of claim 8, wherein the fixing member defines a receiving hole, the sliding portion is slidably received in the receiving hole, and opposite ends of the sliding portion extend out of the receiving hole.

11. The welding fixture of claim 8, wherein the drive assembly comprises a drive member coupled to the fixing member, and a connecting member coupling the drive member and the suction member, wherein the drive member moves the connecting member and thereby moving the suction member along a direction away from the workpiece.

12. The welding fixture of claim 11, wherein the connecting member comprises a resisting portion coupled to the drive member and a fixing portion coupled to the resisting portion, and an end of the fixing portion away from the resisting portion is coupled to the suction member.

13. The welding fixture of claim 8, wherein the fixing member defines a sliding hole, the suction member is inserted into the sliding hole, and opposite ends of the suction member extend out of the fixing member.

14. The welding fixture of claim 8, wherein the protection groove is inverted conical.

\* \* \* \* \*